United States Patent
Jansson

[15] 3,679,027
[45] July 25, 1972

[54] BRAKING METHOD AND APPARATUS

[72] Inventor: Birger F. Jansson, Racine, Wis.
[73] Assignee: J. I. Case Company
[22] Filed: July 23, 1970
[21] Appl. No.: 57,585

[52] U.S. Cl.................................................188/74, 188/29
[51] Int. Cl.......................................................F16d 49/00
[58] Field of Search..................188/29, 74, 77, 58, 76, 250 B

[56] References Cited

UNITED STATES PATENTS

| | | | |
|---|---|---|---|
| 2,940,550 | 6/1960 | Mathews | 188/74 |
| 3,086,620 | 4/1963 | Elfes | 188/74 X |
| 3,298,467 | 1/1967 | Darnell | 188/29 |
| 3,516,519 | 6/1970 | Besoyan | 188/77 |

FOREIGN PATENTS OR APPLICATIONS

| | | | |
|---|---|---|---|
| 192,807 | 12/1907 | Germany | 188/74 |
| 398,194 | 7/1924 | Germany | 188/74 |

*Primary Examiner*—Duane A. Reger
*Attorney*—Dressler, Goldsmith, Clement & Gordon

[57] ABSTRACT

A method and apparatus for exerting a maximum braking force on a rotating member with a minimum amount of force being applied to the braking member. The apparatus includes a disc having opposed surfaces on the periphery thereof which define planes intersecting at an acute angle substantially less than 45°. A brake member is pivoted at one end on a support adjacent the disc and has a radius of curvature which is greater than the radius of the disc with actuating means cooperating with he opposite end of the elongated member to force cooperating surfaces on the member into engagement with the surfaces on the disc. During such movement, the elongated member is distorted to substantially the curvature of the periphery of the disc so that the member will return to its undistorted condition upon release of the actuating means and prevent interlocking of the member and the disc.

9 Claims, 2 Drawing Figures

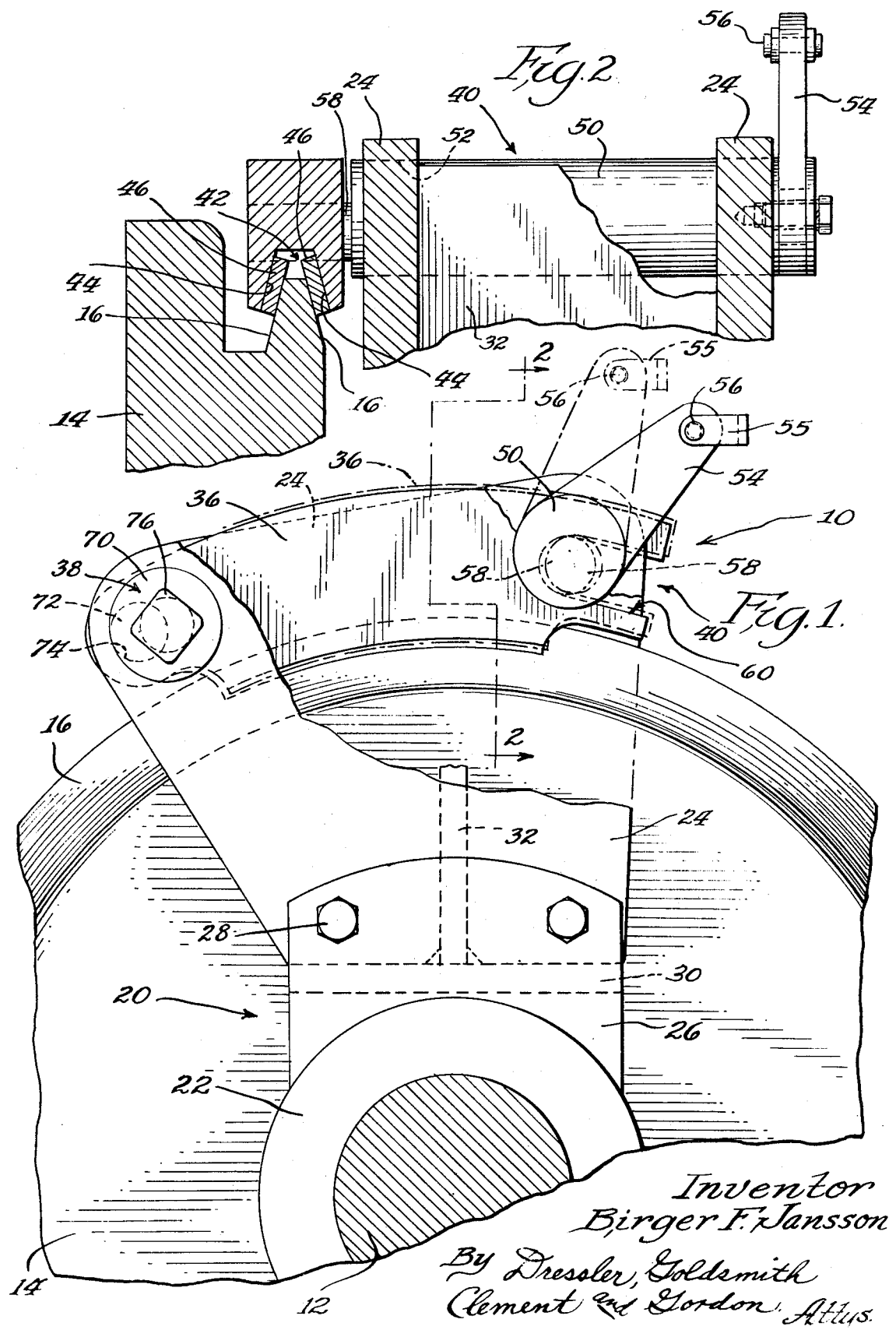

BRAKING METHOD AND APPARATUS

BACKGROUND OF THE INVENTION

In recent years, considerable development work has been performed in the area of producing heavy-duty agricultural vehicles having hydraulic drive mechanisms which replace the conventional gear mechanisms normally utilized in the drive train for the vehicle. One of the problems in developing such a vehicle is that a loss of hydraulic fluid pressure essentially make the unit a free-wheeling device without any control by the operator for stopping the unit. This necessarily results because, normally, such a unit is developed to include hydraulically actuated brakes for performing the normal braking functions. To alleviate this problem, the vehicle normally incorporates a hand brake for stopping the vehicle when hydraulic pressure is lost.

While various types of hand brakes are available, present day hand brakes require an extreme amount of manual force applied to the brake by the operator, when the brake is used to decelerate large agricultural units.

Thus, there remains a need for a simple and inexpensive parking and emergency brake for heavy-duty vehicles which is capable of producing a high braking force with an extremely small input force being supplied by the operator.

SUMMARY OF THE INVENTION

The present invention contemplates a simple and inexpensive brake assembly which is capable of applying a braking force to a rotating disc that greatly exceeds the amount of input force to the assembly.

In its broadest context, the present invention contemplates a method of stopping a rotating disc which comprises forming opposed surfaces adjacent the periphery of the disc with the surfaces intersecting at a location beyond the periphery of the disc to define a very small acute angle; pivotally supporting one end of a braking member about an axis parallel to the disc axis with the curvature of a member having a radius greater than the radius of the disc; moving the opposite end of the member to interengage the member and the disc and simultaneously distort the member within its elastic limit to approximately the curvature of the disc to discontinue rotation of the disc and subsequently releasing the braking member when the disc is stopped to allow the member to return to its undeformed condition and prevent interlocking of the disc and the brake.

The apparatus for accomplishing the above method includes a rotating disc having opposed inclined external surfaces defining planes intersecting at an acute angle of substantially less than 45° with pivot means defined on a support located adjacent the rotating member. One end of a brake shoe is pivotally mounted on the pivot means with the adjacent edge of the shoe having a curved recess having opposed walls inclined to define an angle equal to the acute angle. The curvature of the braking member has a radius slightly greater than the radius of curvature of the periphery of the disc.

An actuating member cooperates with the opposite end of the shoe to move the internal surfaces into engagement with the external surfaces. During such movement, the curved brake shoe is distorted to a curvature corresponding to the curvature of the periphery of the disc and upon release, the distorted member will return to its undistorted condition to insure separation of the surfaces and prevent the brake from being locked to the disc.

The specific actuating means includes a crank pivoted about an axis adjacent the opposite end of the brake shoe with an element on one arm of the crank and eccentric to said axis. The element is slidable in an elongated slot in the brake shoe so that rotation of the actuating member or crank will move the shoe towards and away from the rotating member or disc. During such movement, the eccentric element will be located in close proximity to a plane extending through the axis of the disc and the axis of the crank and result in essentially positioning the shoe to a position for self locking when the disc ceases rotation. However, because of the distorted condition of the brake shoe, upon release of the actuating member, the shoe will automatically move to its undistorted condition and prevent interlocking of the shoe and the disc.

According to a further aspect of the invention, the pivot means for the one end of the elongated member includes a pivot pin eccentrically located relative to a support member rotatable about an axis, so that the position of the shoe relative to the disc can readily be adjusted to compensate for wear of the friction engaging surfaces.

BRIEF DESCRIPTION OF THE SEVERAL VIEWS OF DRAWINGS

FIG. 1 is a fragmentary side elevation view of the braking disc having the braking unit of the present invention associated therewith; and FIG. 2 is a vertical sectional view taken generally along line 2—2 of FIG. 1.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings discloses a brake assembly 10, constructed in accordance with the present invention, cooperating with a shaft 12, the rotation of which is to be controlled by the brake assembly 10. For example, the shaft 12 may be the main axle for an agricultural vehicle with the driven wheels supported on the axial and driven through a suitable power source.

The brake assembly 10 is constructed in a manner to greatly magnify the forces produced on the shaft as a result of a minimum input force to the assembly.

Accordingly, the brake assembly includes a disc 14 fixed for rotation with the shaft 12 through a connection, such as a spline (not shown). The circular disc or rotating member 14 has first and second inclined braking surfaces 16 formed thereon with the surfaces defining planes intersecting at an acute angle beyond the periphery of the member.

The braking assembly further includes a fixed support 20 illustrated as a hub assembly 22 supported on a fixed frame (not shown) and rotatably receiving the shaft 12. A pair of uprights 24 are secured to flanges 26, extending from the hub 24, by bolts 28. The flanges have re-enforcing members 30 and 32 so that the uprights 24 define a rigid support located adjacent the periphery of the rotating disc 14.

The brake assembly of the present invention further includes a brake shoe 36 pivoted at one end of the support through pivot means 38 with actuating means 40 cooperating with the opposite end of the brake shoe, in a manner which will become apparent hereinafter.

According to one aspect of the invention, the brake shoe 36 comprises an elongated member having a curvature generally following the curvature of the rotating member but the elongated member has a larger radius of curvature than that of the rotating member. The brake shoe or elongated member 36 has a recess or slot 42 located along a longitudinal edge thereof which is juxtaposed relation to the periphery of the disc and the longitudinal dimension of the slot has a radius of curvature substantially equal to the radius of curvature of the member in which its formed. The elongated slot 42 includes inclined flat surfaces 44 with the flat surfaces defining planes intersecting at an angle substantially equal to the angle defined by the surfaces 16 on the rotating disc 14. The flat surfaces 44 each have a band of friction material 46 fixedly secured thereto with the respective bands extending the entire length of the respective surfaces 44.

Thus, pivotal movement of the braking shoe 36 from its undeformed condition shown in the phantom line position of FIG. 1, will cause initial engagement of the bands of friction material adjacent the end of the pivot means 38. Continued pivotal movement of the braking shoe, will eventually cause the entire bands of the friction material to be forced into contacting engagement with the respective surfaces 16 on the disc 14. During such movement, the curved elongated member 36 will be distorted or deformed from its original condition to a condition wherein the radius of curvature of the member is substantially equal to the radius of curvature of the periphery of the disc. By maintaining the distortion within the elastic limits of the material, such as a spring steel, deforming the elongated member or shoe 36 will produce an inherent tendency for the member to return to its undistorted condition once the external force on the free end of the member is released. Such an arrangement allows for considerably decreasing the acute angle between the surfaces 14 and 16 to a point where the angle or taper is small enough to make the braking assembly self locking. However, distortion of the brake shoe or elongated member during the application of a braking force, will result in an unlocking force on the brake assembly when the external force to the brake shoe is removed. By making the taper of the two surfaces 16 considerably less than 45°, extremely large braking forces will result from a small force being applied to the braking member.

According to another aspect of the present invention, the actuating member 40 is in the form of an eccentric actuator in which the moment arm of the external force is many times greater than the eccentricity of the actuating member. Such an arrangement will allow actuation of the brake with a minimum amount of external force. Thus, as shown in FIGS. 1 and 2, the actuating member 40 includes a shaft 50 supported for rotation within openings 52 in the respective uprights 24 with an actuating arm 54 extending radially from one end the shaft 50. The shaft 50 and the arm 54 cooperate to define a crank which is rotatable about the axis of the shaft through an external actuator (not shown) connected to the arm through a clevis 55 and pivot pin 56 with the pivot pin located a considerable distance from the pivot axis of the shaft.

The actuating member 40 further includes a pin 58 fixed to the opposite end of the shaft 50 at a location eccentric to the axis of the shaft. The pin 58 is slidably supported within a slot 60 extending from one end of the elongated member 36. It will be appreciated, that location of the pin 58 in close proximity to the center of the shaft 50 and the pin 56 a considerable distance from the shaft will allow an extremely large radial force (relative to the axis of the shaft 12 and the disc 14) from being developed on the free end of the elongated member with a relatively small input force to the actuating member through the clevis 55. Additionally, by proper arrangement of the location of the pivot axis for the shaft 50 and the center or axis of the pin 58, the eccentric 58 may be located between the crank axis and the disc axis and substantially within a plane extending through the disc and crank axes when the surfaces 16 and 44 are in engagement with each other. This will produce an extremely large locking force or braking force when the actuator 50, 54 is in its actuated position. However, because of the construction and arrangement of the shoe 36, the distortion of the shoe during such actuation will result in an inherent tendency for the braking surfaces to be separated after the external force is removed thereby preventing interlocking of the brake shoe and the disc.

According to a further aspect of the present invention, the pivot means 38 defining the pivot axis for one end of the brake shoe 36 incorporates means for repositioning the pivot to compensate for wear on the band of friction material. For this purpose, the pivot means is in the form of a shaft 70 having a pin 72 fixedly secured thereto with the center of the pin 72 being eccentric to the axis of the shaft 70. The end of the elongated member or braking shoe 36 has an opening 74 for receiving the pin and defining the pivot axis therefor. Suitable means, such as a square end 76 may be provided on the shaft 70 to allow for rotation of the shaft relative to the uprights 24. Such rotation will reposition the pivot pin 72 relative to the periphery of the disc and provide a simple and effective manner for compensating for wear on the band of friction material 46. In addition, any type of locking means (not shown) may be incorporated for holding the pivot means 38 in an adjusted position.

The method of the present invention is believed to be understood from the above description but will be summarized briefly. The method contemplates forming an acute angle with opposed surfaces on the periphery of a rotating disc to produce a small taper or acute angle and pivoting curved braking member adjacent the periphery of the disc with the radius of curvature of the member being greater than the radius of the disc and the member having a slot defining opposed walls which intersect at an angle equal to the acute angle on the disc, moving the free end of the member towards the axis of the disc to force the respective surfaces into engagement with each other and distort the braking member to substantially the curvature of the disc and, subsequently, releasing the free end of the member when the disc is stopped to allow the braking member to return to its undistorted condition and thereby prevent locking of the braking member on the disc.

Thus, the present invention provides a braking assembly which is capable of producing large frictional forces on the rotating disc of a rotating shaft to produce extremely high braking torque with a small input force into the device. Furthermore, the device is arranged and constructed to prevent self locking of the unit after the rotation of the disc has been interrupted.

What is claimed is:

1. In a brake assembly of the type having a rigid shoe moved toward and away from a rotating member, the improvement of said rotating member having opposed inclined external surfaces defining planes intersecting at an acute angle of less than 45° beyond the periphery of said member; a support adjacent said rotating member; pivot means on said support with one end of said shoe pivoted on said pivot means, said shoe having a groove with internal surfaces inclined to define an angle equal to said acute angle; and actuating means cooperating with the opposite end of said shoe for pivoting said shoe on said support to move said internal surfaces into engagement with said external surfaces.

2. A brake shoe as defined in claim 1, in which said actuating means comprises an actuating member pivoted about an axis spaced from said pivot means; said actuating member having an element eccentric to said axis and said shoe having an elongated slot receiving said element whereby rotation of said actuating member will move said shoe toward and away from said rotating member.

3. A brake assembly as defined in claim 1, in which said brake shoe comprises an elongated member having a curvature generally following the curvature of the rotating member but having a larger radius of curvature than the curvature of said rotating member.

4. A brake as defined in claim 3, in which said pivot means is located to cause initial engagement of said internal surfaces with said external surfaces adjacent said one end of said shoe whereby said elongated member will be deformed to substantially the curvature of said rotating member by said actuating means and whereby the release of said actuating means will cause said elongated member to return to its undeformed condition.

5. A brake as defined in claim 1, in which said pivot means and said actuating means cooperate to deform said shoe during actuation and in which said shoe returns to an undeformed condition upon release of said actuating means.

6. A brake as defined in claim 5, including the further improvement of means for repositioning said pivot means to compensate for wear of said internal surfaces.

7. A brake unit for controlling a circular disc rotatable about an axis, said disc having opposed inclined surfaces adjacent the outer periphery thereof, comprising an elongated brake shoe having a slot on one elongated edge thereof defining braking surfaces adapted to cooperate with said inclined surfaces, the longitudinal dimension of said slot having a curvature generally following the curvature of the periphery of said disc and having a radius larger than the radius of said disc; a fixed support adjacent the periphery of said disc; means on said support pivotally supporting one end of said brake shoe and locating said slot adjacent to the periphery of said disc; and actuating means cooperating with the opposite end of said brake shoe for moving said cooperating surfaces into and out of engagement with said inclined surfaces to distort the longitudinal dimension to substantially the radius of said disc.

8. A brake unit as defined in claim 7, in which said actuating means includes a crank rotatable about an axis parallel to the axis of said disc and an element on said crank, said element having an axis eccentric to said crank axis, said element axis being located between said crank axis and said disc axis when said cooperating surfaces are in engagement with said inclined surfaces to distort said brake shoe to the configuration of said disc with said brake shoe returning to its undistorted condition upon release of said actuating means to prevent locking of said brake shoe to said disc.

9. A method of stopping a rotating circular disc which comprises pivotally supporting one end of a curved braking member about an axis parallel to the disc axis, the curvature of said member having a radius greater than the radius of said disc; moving the opposite end of said member to interengage said member and said disc and distort said member within its elastic limit to approximately the curvature of said disc; and releasing said braking member when said disc is stopped to allow said member to return to its undeformed condition whereby to prevent said braking member from being locked to said disc.

* * * * *